United States Patent
Sugawara et al.

(10) Patent No.: US 7,132,187 B2
(45) Date of Patent: Nov. 7, 2006

(54) POLYMER ELECTROLYTE FUEL CELL AND PRODUCTION METHOD THEREOF

(75) Inventors: Yasushi Sugawara, Higashiosaka (JP); Makoto Uchida, Hirakata (JP); Yoshihiro Hori, Ikoma (JP); Akihiko Yoshida, Hirakata (JP); Osamu Sakai, Neyagawa (JP); Takeshi Yonamine, Suita (JP); Shinichi Arisaka, Neyagawa (JP); Yasuo Takebe, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 539 days.

(21) Appl. No.: 10/256,269

(22) Filed: Sep. 27, 2002

(65) Prior Publication Data
US 2003/0072990 A1   Apr. 17, 2003

(30) Foreign Application Priority Data
Sep. 27, 2001   (JP) .............................. 2001-298020
Sep. 28, 2001   (JP) .............................. 2001-301735

(51) Int. Cl.
*H01M 4/96* (2006.01)
(52) U.S. Cl. .............................. 429/30; 429/34; 429/35
(58) Field of Classification Search ................. 429/30, 429/34, 35, 36
See application file for complete search history.

(56) References Cited

U.S. PATENT DOCUMENTS 5,766,787 A   6/1998 Watanabe et al.
6,946,214 B1 *   9/2005 Xie et al. ..................... 429/42

FOREIGN PATENT DOCUMENTS

| EP | 0 589 535 A1 | 3/1994 |
|---|---|---|
| EP | 0 911 899 A2 | 4/1999 |
| JP | 61-295387 | 12/1986 |
| JP | 61-295388 | 12/1986 |
| JP | 63-236262 | 10/1988 |
| JP | 6-103992 | 4/1994 |
| JP | 8-88008 | 4/1996 |
| WO | WO 00/24074 | 4/2000 |
| WO | WO 00/79628 A1 | 12/2000 |

* cited by examiner

*Primary Examiner*—Michael Barr
*Assistant Examiner*—Monique Wills
(74) *Attorney, Agent, or Firm*—McDermott Will & Emery LLP

(57) ABSTRACT

Disclosed is a fuel cell comprising: a hydrogen-ion conductive polymer electrolyte membrane; a pair of electrodes sandwiching the hydrogen-ion conductive polymer electrolyte membrane; a first separator plate having a gas flow path for supplying a fuel gas to one of the electrodes; and a second separator plate having a gas flow path for supplying an oxidant gas to the other of the electrodes, wherein each of the electrodes has an electrode catalyst layer comprising at least a conductive carbon particle carrying an electrode catalyst particle and a hydrogen-ion conductive polymer electrolyte, the electrode catalyst layer being in contact with the hydrogen-ion conductive polymer electrolyte membrane, and at least one of the electrodes comprises a catalyst for trapping the fuel gas or the oxidant gas which has passed through the hydrogen-ion conductive polymer electrolyte membrane.

7 Claims, 3 Drawing Sheets

F I G. 1
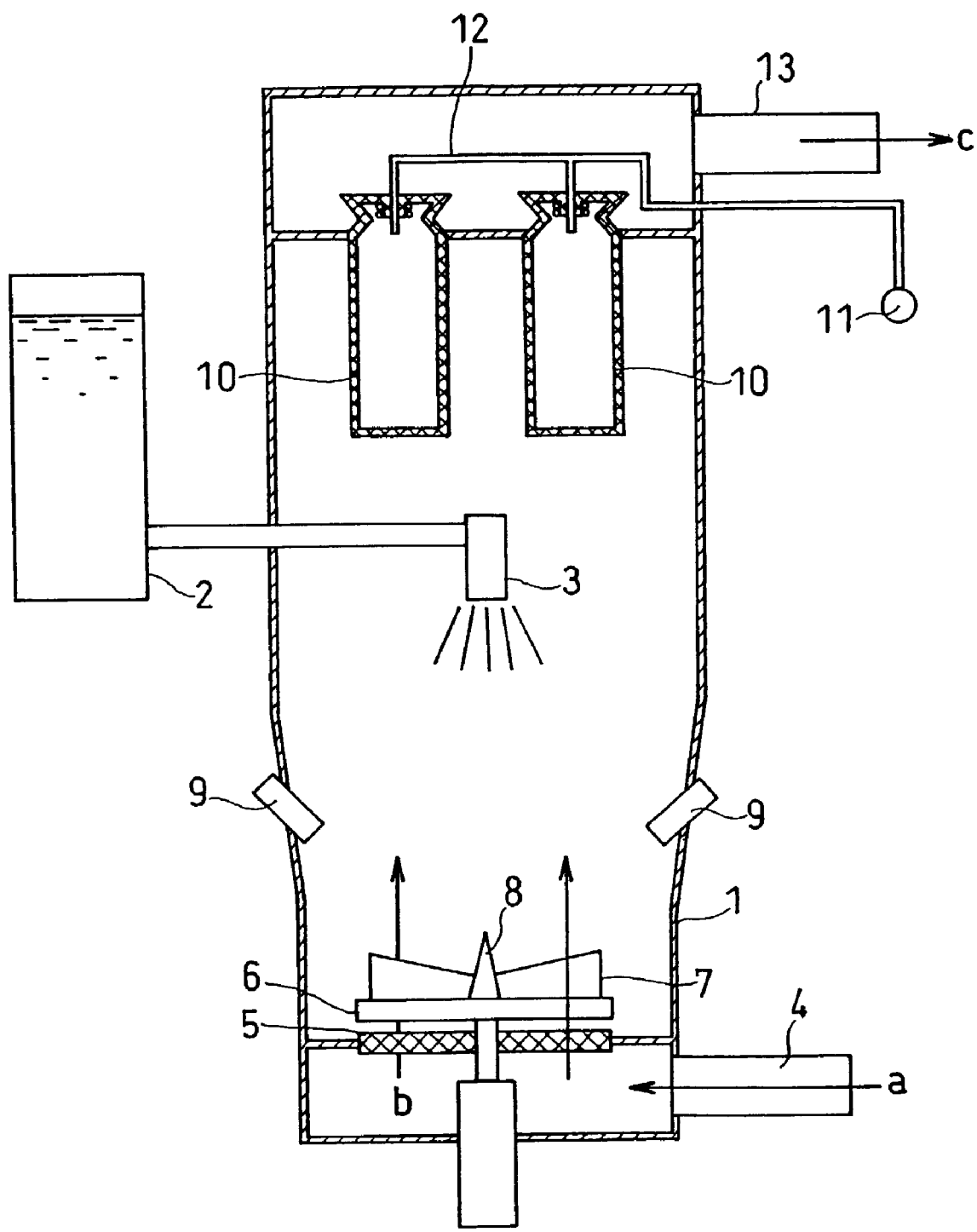

F I G. 4
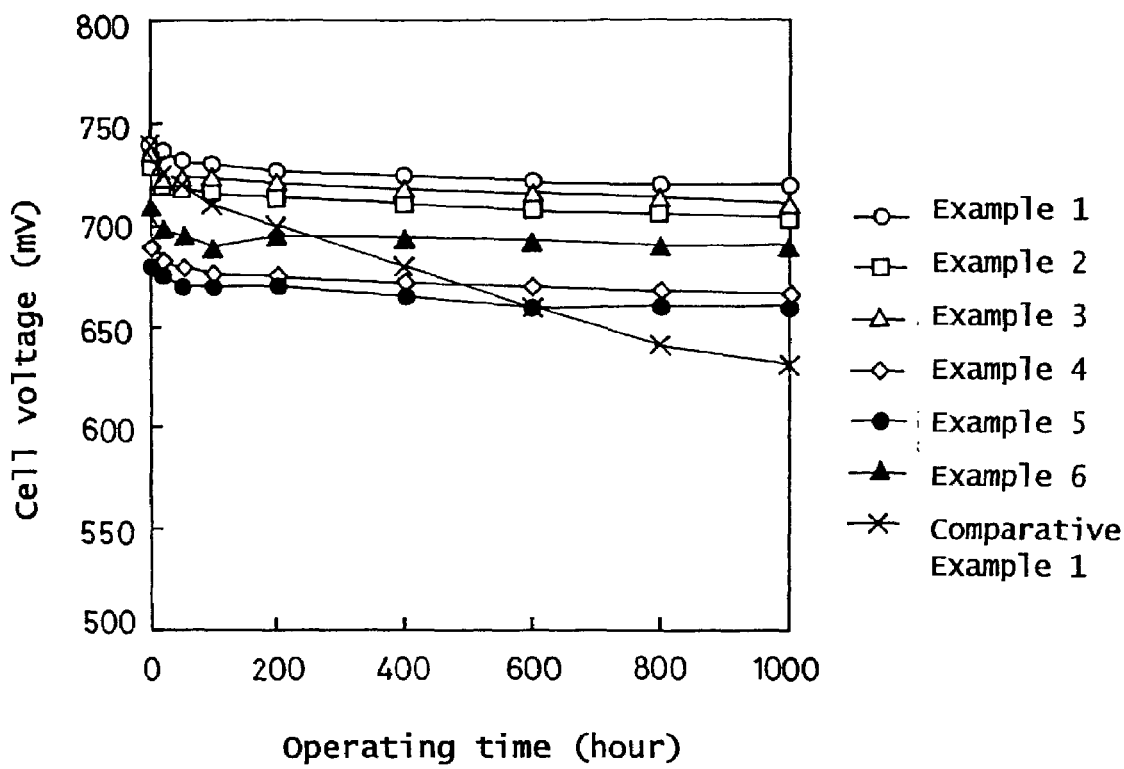
F I G. 5
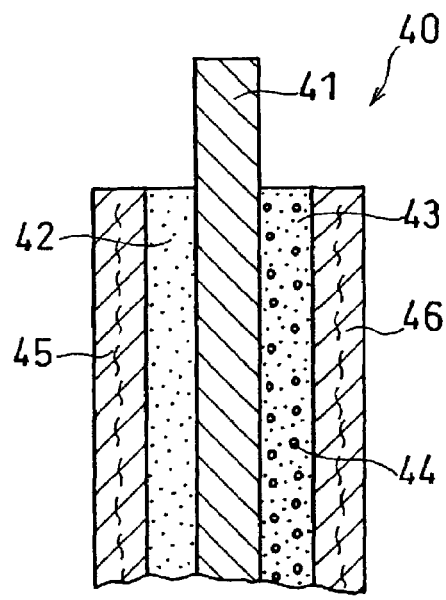

POLYMER ELECTROLYTE FUEL CELL AND PRODUCTION METHOD THEREOF

BACKGROUND OF THE INVENTION

The present invention relates to a polymer electrolyte fuel cell, and particularly to an improvement in electrodes constituting the polymer electrolyte fuel cell.

In the electrodes of a polymer electrolyte fuel cell, the discharge performance of the cell is determined by the area of the so-called "three-phase interface", which is formed by pores serving as a supply path of a reactant gas, a hydrogen-ion conductive polymer electrolyte, and a catalyst material serving as an electron conductor. In order to increase the three-phase interface and reduce the amount of noble metal which is the catalyst material, attempts have been made to mix the hydrogen-ion conductive polymer electrolyte with the catalyst material and disperse it. For example, Japanese Laid-Open Patent Publications No. Sho 61-295387 and No. Sho 61-295388 propose a method by which a dispersion of a hydrogen-ion conductive polymer electrolyte is mixed with a catalyst material, the mixture is applied onto a hydrogen-ion conductive polymer electrolyte membrane, the resultant membrane and electrode materials are hot pressed, and the catalyst material is reduced to a metal catalyst.

Such a polymer electrolyte fuel cell has a following problem: due to cross leak of hydrogen gas from an anode side to a cathode side through a solid polymer electrolyte membrane, the hydrogen partial pressure increases on the cathode side, so that the difference between the chemical potential of hydrogen at the anode and that at the cathode is lessened, thereby resulting in lowered electromotive force. Also, it has been reported that the hydrogen gas which has cross-leaked from the anode side burns locally with oxygen gas in the catalyst layer of the cathode, thereby to deteriorate the polymer electrolyte membrane.

In order to suppress the cross leak of hydrogen gas, Japanese Laid-Open Patent Publication No. Hei 6-103992, for example, discloses a technique in which a catalyst metal is carried in a polymer electrolyte membrane in order to react hydrogen gas and oxygen gas. Further, Japanese Laid-Open Patent Publication No. Hei 8-88008 discloses a technique in which the amount of a fluorocarbon sulfonic acid polymer resin is decreased in the catalyst layers of both anode and cathode in order to react hydrogen gas and oxygen gas that have cross-leaked.

However, the deterioration of the hydrogen-ion conductive polymer electrolyte due to the hydrogen gas and oxygen gas occurs not only in the polymer electrolyte membrane but also in the catalyst layers. Particularly, it is impossible to introduce, into the catalyst layers, a large amount of the hydrogen-ion conductive polymer electrolyte because of the necessity for ensuring diffusion of the reactant gas, so that deterioration of only a small amount of the hydrogen-ion conductive polymer electrolyte constitutes a significant loss in the catalyst layers. Therefore, in the polymer electrolyte fuel cell, the deterioration of the hydrogen-ion conductive polymer electrolyte due to local combustion of hydrogen has a larger impact on the catalyst layers than on the hydrogen-ion conductive polymer electrolyte membrane. The deterioration of the hydrogen-ion conductive polymer electrolyte is remarkable in the catalyst layer of the cathode.

Because of the deterioration of the hydrogen-ion conductive polymer electrolyte, the power generating efficiency of the fuel cell lowers with passage of its operating time. However, when the humidity of the oxidant gas supplied is high and the catalyst layer is therefore supplied with sufficient water, the loss of the hydrogen-ion conductive polymer electrolyte can be suppressed, since the hydrogen-ion conductive polymer electrolyte is swollen with water and heat generated by combustion is therefore scattered and lost. When the humidity of the oxidant gas supplied is low, on the other hand, severe decomposition of the hydrogen-ion conductive polymer electrolyte occurs to cause a considerable reduction in the power generating efficiency, since the hydrogen-ion conductive polymer electrolyte in the catalyst layer is dry and heat generated by combustion concentrates.

BRIEF SUMMARY OF THE INVENTION

The present invention aims to solve the above-described problems.

In one aspect of the present invention, hydrogen gas which has leaked into the cathode side through the hydrogen-ion conductive polymer electrolyte membrane is promptly reacted with oxygen gas by a catalyst provided on the hydrogen-ion conductive polymer electrolyte membrane side of the cathode, so that the hydrogen gas is prevented from reaching the reaction site of the cathode. In this way, since the hydrogen gas which has leaked into the cathode side is trapped by the catalyst, the deterioration of the hydrogen-ion conductive polymer electrolyte in the cathode catalyst layer is suppressed. Therefore, the present invention can provide a fuel cell of which power generating efficiency is maintained favorably over an extended period of time even when the humidity of the oxidant gas supplied is low.

In another aspect of the present invention, oxidant gas which has leaked into the anode side through the hydrogen-ion conductive polymer electrolyte membrane is promptly reacted with hydrogen gas by a catalyst provided on the hydrogen-ion conductive polymer electrolyte membrane side of the anode, so that the oxidant gas is prevented from reaching the reaction site of the anode.

The present invention provides a polymer electrolyte fuel cell comprising: a hydrogen-ion conductive polymer electrolyte membrane; a pair of electrodes sandwiching the hydrogen-ion conductive polymer electrolyte membrane; a first separator plate having a gas flow path for supplying a fuel gas to one of the electrodes; and a second separator plate having a gas flow path for supplying an oxidant gas to the other of the electrodes, wherein each of the electrodes has an electrode catalyst layer comprising at least a conductive carbon particle carrying an electrode catalyst particle and a hydrogen-ion conductive polymer electrolyte, the electrode catalyst layer being in contact with the hydrogen-ion conductive polymer electrolyte membrane, and at least one of the electrodes comprises a catalyst for trapping the fuel gas or the oxidant gas which has passed through the hydrogen-ion conductive polymer electrolyte membrane from the other electrode toward the electrode catalyst layer of the one of the electrodes.

The catalyst for trapping the fuel gas or the oxidant gas is preferably a catalyst for promoting the reaction of hydrogen and oxygen to produce water.

In a preferred embodiment of the present invention, the catalyst for promoting the reaction of hydrogen and oxygen to produce water is included in the electrode catalyst layer. The catalyst for promoting the reaction of hydrogen and oxygen to produce water is desirably contained in the cathode catalyst layer.

In another preferred embodiment of the present invention, a thin layer of the catalyst for promoting the reaction of hydrogen and oxygen to produce water is formed between the hydrogen-ion conductive polymer electrolyte membrane and the electrode catalyst layer. The thin layer of the catalyst for promoting the reaction of hydrogen and oxygen to produce water is desirably provided at an interface between the cathode catalyst layer and the hydrogen-ion conductive polymer electrolyte membrane.

In the above-mentioned embodiments, the catalyst for promoting the reaction of hydrogen and oxygen to produce water is desirably coated with the hydrogen-ion conductive polymer electrolyte so as to be electrically insulated from the electrode.

The weight ratio of the hydrogen-ion conductive polymer electrolyte to the carrier carrying the catalyst for promoting the reaction of hydrogen and oxygen to produce water is desirably from 1.6 to 2.0.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a conceptual diagram of a coating apparatus used in examples of the present invention.

FIG. 4 is a graph showing the characteristics of unit cells in examples of the present invention and a comparative example.

FIG. 5 is a longitudinal sectional view schematically showing an MEA in another example of the present invention.

DETAILED DESCRIPTION OF THE INVENTION

Figure 2:
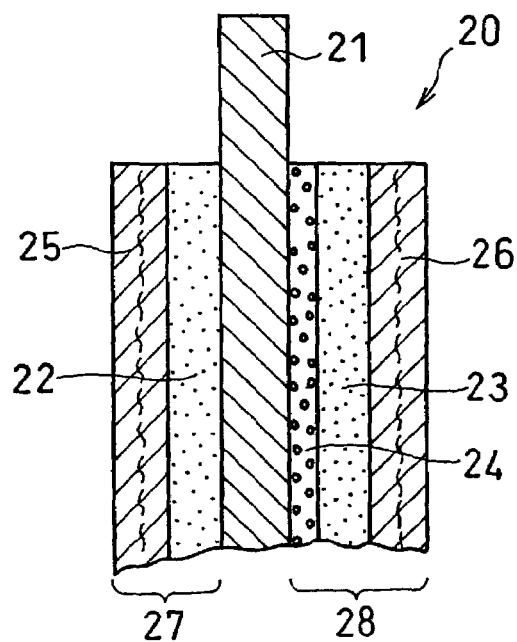
FIG. 2 is a longitudinal sectional view schematically showing an MEA in one example of the present invention.

In a polymer electrolyte fuel cell in accordance with the present invention, at least one of the electrodes comprises a catalyst for trapping the fuel gas or the oxidant gas which has passed through the hydrogen-ion conductive polymer electrolyte membrane from the other electrode toward the electrode catalyst layer of the one of the electrodes, particularly a catalyst for promoting the reaction of hydrogen and oxygen to produce water.

Preferable arrangements of the catalyst for promoting the reaction of hydrogen and oxygen to produce water may be divided into following two types:

(1) this catalyst is mixed with the electrode catalyst at a certain ratio and is dispersed in the electrode catalyst layer.

(2) a thin layer of this catalyst is formed at an interface between the hydrogen-ion conductive polymer electrolyte membrane and the electrode catalyst layer.

The advantage of type (1) is that this catalyst can be arranged in a simple process. However, there is a disadvantage that due to dispersion of this catalyst, the efficiency of trapping hydrogen gas is low. The advantage of type (2) is that this catalyst is present in the form of a thin layer and is therefore capable of effectively trapping hydrogen gas. Its disadvantage is that the process for forming the layer of this catalyst is complicated.

As the catalyst for promoting the reaction of hydrogen and oxygen to produce water, metal having good affinity for oxygen may be used. Examples of such metal include platinum, ruthenium, rhodium and palladium. These metals may be used alone, or an alloy of one of these metals and another metal may be used. Also, oxides of these metals exhibit favorable reactivity with hydrogen gas and oxygen gas.

In order to reduce the amount of these metals used while ensuring effective reactivity with hydrogen gas and oxygen gas, the catalyst is desirably carried, in a state of fine particle, on a carrier such that the specific surface area of the catalyst is enlarged. As the carrier, ceramics such as zirconia, alumina, zeolite and silica as well as carbon black may be used.

In a preferred embodiment of the present invention, the catalyst for promoting the reaction of hydrogen and oxygen to produce water is mixed into the electrode catalyst layer. In this case, the catalyst that is electrically in contact with the electrode has the same potential, at its surface, as that of the electrode and is therefore unable to effectively react hydrogen gas with oxygen gas. Thus, it is desirable to electrically insulate the catalyst from the electrode. When the catalyst carried on a conductive carrier such as carbon black is mixed into the electrode catalyst layer, it is necessary to insulate the catalyst from the electrode to avoid electrical connection with the electrode. In order to effectively insulate the catalyst from the electrode, it is effective to coat the catalyst with the hydrogen-ion conductive polymer electrolyte. The coating of the catalyst with the hydrogen-ion conductive polymer electrolyte also produces the effects of not adversely affecting the hydrogen ion conductivity and therefore of not lowering the power generating efficiency. In coating, the ratio of the hydrogen-ion conductive polymer electrolyte to the catalyst carrier particle is important. When the weight ratio of the hydrogen-ion conductive polymer electrolyte to the carrier is too small, sufficient insulation cannot be obtained, and the hydrogen ion conductivity becomes low. When the weight ratio is too large, the catalyst for promoting the reaction of hydrogen and oxygen to produce water is excessively coated with the hydrogen-ion conductive polymer electrolyte, so that the concentration of the catalyst in the electrode catalyst layer becomes low, thereby resulting in decreased trapping efficiency. The weight ratio of the hydrogen-ion conductive polymer electrolyte to the carrier is preferably in a range of 1.6 to 2.0, and more preferably in a range of 1.6 to 1.8. In such a range, ensuring insulation and ensuring trapping efficiency can be mutually compatible. When the electrode catalyst is coated with the hydrogen-ion conductive polymer electrolyte, however, it is necessary not to make the electrode catalyst an insulator. The weight ratio of the hydrogen-ion conductive polymer electrolyte to the carrier of the electrode catalyst is preferably in a range of 0.6 to 1.6.

When the catalyst carried on an insulating carrier such as zirconia, alumina, zeolite or silica is used, insulation of the catalyst from the electrode is readily possible. However, it is effective, also in the case of using such a carrier, that the catalyst is coated with the hydrogen-ion conductive polymer electrolyte, in view of the hydrogen ion conductivity.

In a preferred embodiment of the present invention, at least one of the electrode catalyst layers comprises a water repellent carbon powder carrying a water repellent material. This enables optimization of water management in the electrode catalyst layer. The expression of "optimization of water management" as used herein refers to achieving a state in which water content necessary for maintaining the hydrogen ion conductivity of the hydrogen-ion conductive polymer electrolyte is retained in the electrode catalyst layer while excessive water content is promptly discharged to outside of the electrode so as not to hinder the diffusion/supply of the fuel gas or the oxidant gas which is an active material.

The ratio of the water repellent carbon powder to the conductive carbon particle carrying the electrode catalyst is preferably from 3/97 to 50/50, and more preferably from 5/95 to 40/60.

In the following, the production method of a polymer electrolyte fuel cell comprising the catalyst for promoting the reaction of hydrogen and oxygen to produce water will be explained.

First, type (1), in which the catalyst for promoting the reaction of hydrogen and oxygen to produce water (hereinafter referred to as "trapping catalyst") is dispersed in the electrode catalyst layer, will be described.

The production method of this type comprises the steps of: coating a trapping catalyst with a hydrogen-ion conductive polymer electrolyte; mixing the coated trapping catalyst with an electrode catalyst and a dispersion medium to prepare an ink; and forming an electrode catalyst layer from the ink. In preparing the ink, it is preferable to use an electrode catalyst coated with the hydrogen-ion conductive polymer electrolyte. Instead of or in addition to the coating with the hydrogen-ion conductive polymer electrolyte, the electrode catalyst may be mixed with the hydrogen-ion conductive polymer electrolyte. Formation of the electrode catalyst layer from the ink may be done by a process of applying the ink directly onto the surface of the hydrogen-ion conductive polymer electrolyte membrane. Alternatively, it may be conducted by a process of applying the ink onto the surface of a suitable substrate to form an electrode catalyst layer and transferring the electrode catalyst layer onto the surface of the hydrogen-ion conductive polymer electrolyte membrane.

Next, type (2), in which a thin layer of the trapping catalyst is formed at an interface between the hydrogen-ion conductive polymer electrolyte membrane and the electrode catalyst layer, will be described.

A method of type (2) comprises the steps of: coating a trapping catalyst with a hydrogen-ion conductive polymer electrolyte; mixing the coated catalyst with a dispersion medium to prepare an ink; applying the ink onto one face of a hydrogen-ion conductive polymer electrolyte membrane to form a thin layer comprising the catalyst; and applying an electrode catalyst ink comprising an electrode catalyst, the hydrogen-ion conductive polymer electrolyte and a dispersion medium onto the thin layer to form an electrode catalyst layer thereon.

Another method comprises the steps of: applying an electrode catalyst ink comprising an electrode catalyst, a hydrogen-ion conductive polymer electrolyte and a dispersion medium onto a substrate to form an electrode catalyst layer thereon; coating a trapping catalyst with a hydrogen-ion conductive polymer electrolyte; mixing the coated catalyst with a dispersion medium to prepare an ink; applying the ink thus prepared onto the electrode catalyst layer to form a thin layer comprising the catalyst thereon; and transferring the thin layer and the electrode catalyst layer onto one face of a hydrogen-ion conductive polymer electrolyte membrane.

In the transferring step, the thin layer and the electrode catalyst layer formed thereon may be transferred together. Alternatively, the thin layer may be transferred first, and the electrode catalyst layer may then be transferred onto the thin layer.

In preparing the electrode catalyst ink, it is preferable to use an electrode catalyst coated with the hydrogen-ion conductive polymer electrolyte.

In order to form an electrode catalyst layer comprising a water repellent carbon powder in the above-described methods, a water repellent carbon powder carrying a water repellent material may be added to the electrode catalyst ink.

As the dispersion medium used for the preparation of the above-described inks, alcohols such as methanol and ethanol, water, glycols such as ethylene glycol and propylene glycol, and ether derivatives such as ethylene glycol monomethyl ether may be used. As the application method of ink, screen printing, coater coating, spray coating, curtain coating or the like may be employed for forming the electrode catalyst layer into which the trapping catalyst is mixed, the thin layer of the trapping catalyst and the electrode catalyst layer.

As the substrate for forming the thin layer of the trapping catalyst and the electrode catalyst layer, a film of polypropylene, polyethylene terephthalate, polytetrafluoroethylene, etc. may be used. In order to transfer the thin layer formed on such a substrate onto the polymer electrolyte membrane, the substrate is laminated to the polymer electrolyte membrane so as to bring the thin layer in contact with the polymer electrolyte membrane and is hot pressed, and the substrate is then removed. By this process, the thin layer on the substrate is bonded to the polymer electrolyte membrane. The temperature of the hot pressing is normally from 100 to 160° C.

The step of coating the trapping catalyst with the hydrogen-ion conductive polymer electrolyte preferably comprises the steps of: spraying a dispersion of the hydrogen-ion conductive polymer electrolyte to the catalyst which is flowing and drying the catalyst, thereby attaching the hydrogen-ion conductive polymer electrolyte to the catalyst; grinding the catalyst with the hydrogen-ion conductive polymer electrolyte attached thereto; and granulating the catalyst with the hydrogen-ion conductive polymer electrolyte attached thereto.

The production step of the water repellent carbon powder preferably comprises the steps of: spraying a dispersion of the water repellent material to a carbon powder which is flowing and drying the carbon powder, thereby attaching the water repellent material to the carbon powder; grinding the carbon powder with the water repellent material attached thereto; and granulating the carbon powder with the water repellent material attached thereto. The water repellent carbon powder preferably has a particle size of about 0.3 to 40 µm.

According to this method, without the water repellent material forming large agglomeration and with the use of a small amount of the water repellent material, it is possible to attach the water repellent material uniformly to the carbon powder. Therefore, the water management of the electrode catalyst layer is stabilized over the long term, thereby making it possible to yield an electrode of which voltage is stable over an extended period of time.

It is preferable that the production step of the water repellent carbon powder further comprise the step of baking the water repellent carbon powder at 275 to 380° C. The baking removes impurities, such as a surfactant, contained in the dispersion of the water repellent material or the like.

Next, an apparatus suitable for carrying out the method of coating the trapping catalyst with the hydrogen-ion conductive polymer electrolyte and the method of attaching the water repellent material to the carbon powder will be described.

FIG. 1 is a conceptual diagram showing a spray drying apparatus used for producing particles of the trapping catalyst coated with the hydrogen-ion conductive polymer electrolyte and other particles. A container 1 is formed by connecting a lower cylindrical container, a cylinder member having a taper such that the diameter increases toward the upper portion thereof, and an upper cylindrical container. Provided at the lower portion of the container 1 is a heater-equipped gas inlet pipe 4, through which nitrogen gas controlled to have a constant temperature is introduced for creating a dry atmosphere inside the container. In the lower portion of the container 1, a metal filter 5 is provided for preventing dusts from entering into the container. Above the metal filter 5, a granulation plate 6 having a large number of air vents, and a stirring blade 7, which is fixed on the granulation plate and has a collision target 8 disposed at the center thereof, are rotatably provided. Disposed on the wall of the container, which is located above the above-described parts, is a pair of compressed gas jet nozzles 9, from which a compressed gas is jetted toward the collision target 8. In the middle portion of the container 1, a high-pressure spray 3 is provided. The high-pressure spray 3 sprays, into the container, a solution or dispersion of a hydrogen-ion conductive polymer electrolyte, or a dispersion of a water repellent material, each of which is contained in a container 2. In the upper portion of the container 1, bag filters 10 are provided. Into each of the bag filters 10, a pipe 12 for jetting a compressed gas supplied from a pump 11 is inserted. The compressed gas is suitably jetted from the pump 11, via the pipe 12, into each of the bag filters 10 in order to filter off powders and the like attached to the outer surfaces of the bag filters. At the top portion of the container, a gas exhaust pipe 13 is provided.

In order to produce catalyst particles coated with a hydrogen-ion conductive polymer electrolyte with the above-described apparatus, firstly, catalyst particles are charged onto the granulation plate 6 in the container 1. Subsequently, a solution or dispersion of a hydrogen-ion conductive polymer electrolyte is sprayed from the high-pressure spray 3. The catalyst particles in the container 1 are blown up toward the upper portion of the container by nitrogen gas at a constant temperature being supplied from the gas inlet pipe 4. The nitrogen gas supplied from the gas inlet pipe 4 is blown up from the metal filter 5 and the granulation plate 6 toward the upper portion of the container, along the arrows "a" and "b", each indicating the gas flow direction. The granulation plate 6 has ventilation slits, which are opened such that flow rate therethrough increases in the direction of the circumference of the granulation plate. A flow generated by gas that has passed through the granulation plate 6 causes the catalyst particles charged in the container 1 to flow toward the upper portion of the container, where the solution or dispersion of the hydrogen-ion conductive polymer electrolyte is attached to the catalyst particles and the whole is dried.

The catalyst particles with the hydrogen-ion conductive polymer electrolyte attached thereto precipitate onto the granulation plate 6, and then are granulated on the rotating granulation plate 6. The stirring blade 7 rotates at a high speed to grind the particles which are precipitating thereon. The flowing catalyst particles are ground into lower-order particles by jet grinding with a pulse-jet intermittently jetted from the compressed gas jet nozzle 9 to the collision target 8. The nitrogen gas supplied into the system is exhausted through the exhaust pipe 13 to the outside of the system, with the catalyst particles and the solidified hydrogen-ion conductive polymer electrolyte powder filtrated therefrom by the bag filters 10 placed on the upper portion in the container.

With the use of the above-described apparatus, it is possible to spray a solution or dispersion of a hydrogen-ion conductive polymer electrolyte to catalyst particles and to dry the whole, thereby attaching the hydrogen-ion conductive polymer electrolyte to the catalyst particles, while granulating the catalyst particles to a suitable particle size. That is, the sprayed solution or dispersion of a hydrogen-ion conductive polymer electrolyte is attached on the surface of the catalyst particles and the catalyst particles are then dried to vaporize the solvent or dispersion medium, so that it is possible to attach only the hydrogen-ion conductive polymer electrolyte on the surface of the catalyst particles, uniformly. Moreover, by additionally performing grinding, the catalyst particles are finely ground (e.g., a higher-order multinary particle is ground into a lower-order multinary particle). As a result, the hydrogen-ion conductive polymer electrolyte can be uniformly attached to the entire catalyst particle, including the surface thereof.

When an electrode catalyst is used in place of the trapping catalyst, it is possible to produce an electrode catalyst coated with a hydrogen-ion conductive polymer electrolyte. Also, when a carbon powder and a dispersion of a water repellent material are used in place of the catalyst and the solution or dispersion of the hydrogen-ion conductive polymer electrolyte, respectively, it is possible to produce a water repellent carbon powder.

In the following, examples of the present invention will be described more specifically.

EXAMPLE 1

In this example, a trapping catalyst was coated with a hydrogen-ion conductive polymer electrolyte, and using the coated catalyst, an MEA was produced. A conductive carbon particle carrying a platinum particle having an average particle size of about 30 Å at 50 wt % (TEC10E50E manufactured by Tanaka Kikinzoku Kogyo K.K.) was used as the trapping catalyst.

Using the apparatus as shown in FIG. 1, a solution of a hydrogen-ion conductive polymer electrolyte was sprayed onto the above-mentioned catalyst particles and dried to coat the surfaces of the catalyst particles with the hydrogen-ion conductive polymer electrolyte. Herein, a perfluorocarbon sulfonic acid solution having a concentration of 10 wt % (SE10072, manufactured by E.I. Du Pont de Nemours & Co. Inc.) was used as the hydrogen-ion conductive polymer electrolyte solution. This step was performed, using the above-described apparatus, under the following conditions:

Amount of catalyst particles charged: 40 g
Amount of hydrogen-ion conductive polymer electrolyte solution used: 296 g
Velocity of hydrogen-ion conductive polymer electrolyte solution sprayed by high-pressure spray 3: 2 g/min
Nitrogen gas inlet temperature: 100° C.
Nitrogen gas flow rate: 0.06 m$^3$/min
Rotational speed of stirring blade 7: 300 rpm
On/off interval of pulse-jet 9: 1 time/12 sec The catalyst particles thus obtained had, at the state of the primary particle thereof, the hydrogen-ion conductive polymer electrolyte uniformly placed on the surfaces thereof, and had an average particle size of about 5 μm.

6 g of the catalyst coated with the hydrogen-ion conductive polymer electrolyte was moistened with 5 g of water, and was then mixed with 5 g of ethylene glycol to prepare an ink A in paste form for forming a trapping catalyst layer. The weight ratio of the hydrogen-ion conductive polymer electrolyte to the carbon carrier in the catalyst was 1.6.

Next, a cathode catalyst was coated with the hydrogen-ion conductive polymer electrolyte in the same manner. That is, the same catalyst particles (TEC10E50E) were used as the cathode catalyst. The coating apparatus of FIG. 1 was operated under the same conditions as those described above except that the amount of catalyst particles charged was 40 g and that the amount of hydrogen-ion conductive polymer electrolyte solution used was 185 g. 6 g of the cathode catalyst coated with the hydrogen-ion conductive polymer electrolyte was moistened with 5 g of water, and was then mixed with 5 g of ethylene glycol to prepare an ink B in paste form for forming a cathode catalyst layer. The weight ratio of the hydrogen-ion conductive polymer electrolyte to the carbon carrier in the catalyst was 1.0.

Meanwhile, a conductive carbon powder carrying an alloy of platinum and ruthenium (TEC61E54, manufactured by Tanaka Kikinzoku Kogyo K.K., with a platinum content of 30 wt % and a ruthenium content of 24 wt %) was prepared as an anode catalyst. The coating apparatus was operated under the same conditions as those described above except that the amount of anode catalyst particles charged was 40 g and that the amount of hydrogen-ion conductive polymer electrolyte solution used was 221 g. 6 g of the anode catalyst coated with the hydrogen-ion conductive polymer electrolyte was moistened with 5 g of water, and was then mixed with 5 g of ethylene glycol to prepare an ink C in paste form for forming an anode catalyst layer. The ink was applied, by a bar coater, onto the surface of a polypropylene sheet and was dried to form the anode catalyst layer. The weight ratio of the hydrogen-ion conductive polymer electrolyte to the carbon carrier in the anode catalyst layer was 1.2.

Thereafter, the ink A was applied, by screen printing, onto one face of a hydrogen-ion conductive polymer electrolyte membrane (Nafion 112, manufactured by E.I. Du Pont de Nemours & Co. Inc.) having outer dimensions of 13 cm×13 cm, and was then dried in a nitrogen atmosphere to form the trapping catalyst layer. The ink B was applied onto the trapping catalyst layer by screen printing and was then dried in a nitrogen atmosphere to form the cathode catalyst layer. Subsequently, the anode catalyst layer formed on the polypropylene sheet was bonded to the other face of the hydrogen-ion conductive polymer electrolyte membrane by hot pressing (135° C. for 10 minutes). The amount of platinum contained in the cathode composed of the trapping catalyst layer and the cathode catalyst layer was adjusted to 0.5 mg/cm². The average thickness of the trapping catalyst layer was adjusted to 5 to 10 μm, and the average thickness of the cathode catalyst layer was adjusted to 20 μm. Also, the amount of platinum contained in the anode was adjusted to 0.3 mg/cm², and the average thickness of the anode catalyst layer was adjusted to 20 μm.

Meanwhile, a carbon paper, which would become a gas diffusion layer of the electrode, was subjected to a water repellency treatment. Carbon nonwoven fabric (TGP-H-120, manufactured by Toray Industries, Inc.), having a thickness of 360 μm, was immersed into an aqueous dispersion of a fluorocarbon resin (Neoflon ND1, manufactured by DAIKIN INDUSTRIES, LTD.), and was then dried and heated at 400° C. for 30 minutes to make it water repellent. Further, a conductive carbon powder was mixed with an aqueous dispersion of polytetrafluoroethylene (PTFE) fine powder to prepare an ink. The ink was applied onto one face of the carbon non-woven fabric by screen printing to form a water repellent layer. The water repellent layer was formed so as to be partially embedded in the carbon non-woven fabric.

A pair of carbon papers thus formed was bonded, by hot-pressing, to the hydrogen-ion conductive polymer electrolyte membrane having the catalyst layers formed thereon such that the water repellent layers thereof were in contact with the catalyst layers. This gave an electrolyte membrane-electrode assembly (MEA). The structure of the MEA is shown in FIG. 2.

An MEA 20 is composed of a hydrogen-ion conductive polymer electrolyte membrane 21, an anode 27 consisting of a catalyst layer 22 and a gas diffusion layer 25 formed on one side of the polymer electrolyte membrane 21, and a cathode 28 consisting of a catalyst layer 23, a gas diffusion layer 26 and a trapping catalyst layer 24 formed on the other side of the polymer electrolyte membrane 21.

Figure 3:
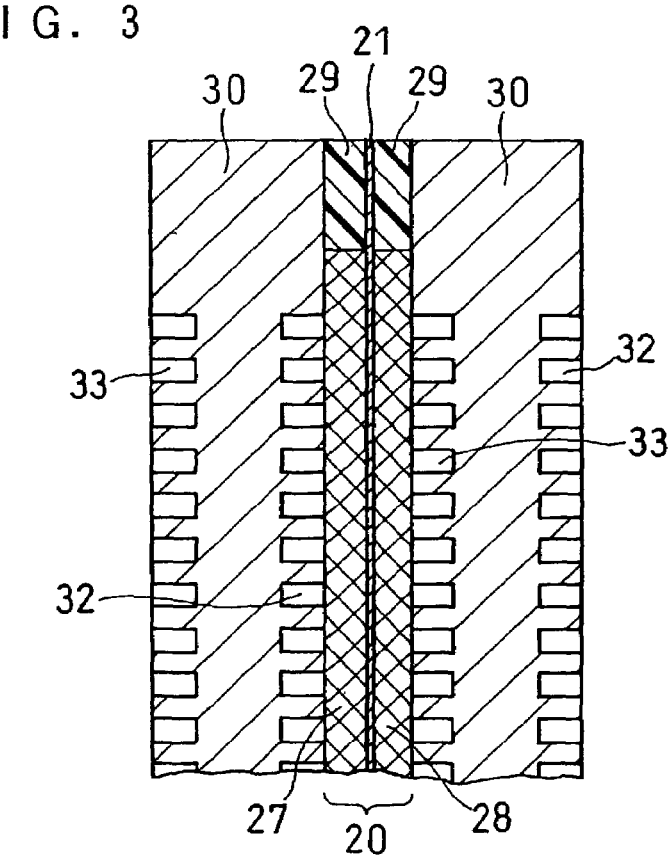
FIG. 3 is a longitudinal sectional view schematically showing a unit cell comprising the same MEA.

Using the MEA, a unit cell was assembled and tested for measuring fuel cell characteristics. The structure of the unit cell is shown in FIG. 3. The MEA 20 is sandwiched between a pair of conductive separator plates 30. Each of the separator plates 30 has, on its anode-facing surface, a gas flow path 32 for supplying a fuel gas to the anode, and has, on its cathode-facing surface, a gas flow path 33 for supplying an oxidant gas to the cathode. A pair of gaskets 29 is fitted to the periphery of the hydrogen-ion conductive polymer electrolyte membrane so as to sandwich the polymer electrolyte membrane.

The unit cell was maintained at 75° C., and hydrogen gas humidified to have a dew point of 70° C. was supplied to the anode while air humidified to have a dew point of 45° C. was supplied to the cathode. Thereafter, a discharge test was conducted under the conditions of a fuel utilization rate of 80%, an air utilization rate of 40% and a current density of 200 mA/cm². As a result, almost no deterioration occurred in the voltage of the cell during long hours of operation. The change with time in cell voltage is shown in FIG. 4.

In the foregoing test, a catalyst comprising platinum carried on carbon black was used as the trapping catalyst. However, the use of a catalyst comprising a platinum-ruthenium alloy, a platinum-rhodium alloy or a platinum-palladium alloy carried on carbon black (manufactured by E-TEK Inc.) also produced almost the same results although slight deterioration in performance was observed.

COMPARATIVE EXAMPLE 1

An MEA was produced in the same manner as in Example 1 except for the omission of the step of forming a trapping catalyst layer. Using the MEA, a unit cell was assembled for measuring fuel cell characteristics, and a discharge test was conducted under the same conditions as those of Example 1.As a result, the voltage of the cell deteriorated with passage of operating time.

EXAMPLE 2

19 g of a 10 wt % aqueous solution of a tetraammine platinum(II) chloride was dissolved in 1000 ml of water. To this solution was added 10 g of a zirconia powder (manufactured by Kanto Chemical Co., Inc.). While the resultant solution was stirred, 60 ml of a 5 wt % aqueous solution of sodium hydroxide was dropped thereto to adjust the pH of the solution to 5.Thereafter, the precipitate of the resultant solution was filtered, dried, and heated to 400° C. in a nitrogen atmosphere so that platinum was carried on the surface of zirconia.

The trapping catalyst thus produced was charged into the apparatus of FIG. 1 and was coated with a hydrogen-ion conductive polymer electrolyte in the same manner as in Example 1. The amount of catalyst charged into the apparatus of FIG. 1 was 10 g, and the amount of hydrogen-ion conductive polymer electrolyte solution used was 144 g. 6 g of the trapping catalyst coated with the hydrogen-ion conductive polymer electrolyte was moistened with 5 g of water, and was then mixed with 5 g of ethylene glycol to prepare an ink in paste form. The ink was applied onto a hydrogen-ion conductive polymer electrolyte membrane by screen printing in the same manner as in Example 1 to form a trapping catalyst layer. The weight ratio of the hydrogen-ion conductive polymer electrolyte to the zirconia in the trapping catalyst was 1.6. The amount of trapping catalyst applied was adjusted such that the content of platinum became 0.3 mg/cm$^2$.

On the hydrogen-ion conductive polymer electrolyte membrane having the trapping catalyst layer formed on its cathode side, a cathode catalyst layer and an anode catalyst layer were formed in the same manner as in Example 1. Using the resultant membrane, an MEA was produced in the same manner as in Example 1, and using the MEA, a unit cell was assembled for measuring fuel cell characteristics. A discharge test was conducted under the same conditions as those of Example 1. As a result, almost no deterioration occurred in the voltage of the cell during long hours of operation. The change with time in cell voltage is shown in FIG. 4. Also, the use of alumina, zeolite or silica as the carrier of the trapping catalyst in place of zirconia produced the same results.

EXAMPLE 3

The ink A of Example 1 was applied, by a bar coater, onto the surface of a polypropylene sheet and was dried to form a trapping catalyst layer. Also, the ink B of Example 1 was applied, by a bar coater, onto the surface of a polypropylene sheet and was dried to form a cathode catalyst layer.

Next, the trapping catalyst layer was transferred, by hot pressing, to one face of a hydrogen-ion conductive polymer electrolyte membrane having outer dimensions of 13 cm×13 cm. Subsequently, the cathode catalyst layer was placed on the transferred trapping catalyst layer while an anode catalyst layer formed on a polypropylene sheet in the same manner as in Example 1 was placed on the other face of the hydrogen-ion conductive polymer electrolyte membrane, and the membrane and these layers were bonded to one another by hot pressing (135° C. for 10 minutes). The amount of platinum contained in the cathode composed of the trapping catalyst layer and the cathode catalyst layer was adjusted to 0.5 mg/cm$^2$. The average thickness of the trapping catalyst layer was adjusted to 5 to 10 μm, and the average thickness of the cathode catalyst layer was adjusted to 20 μm. Also, the amount of platinum contained in the anode was adjusted to 0.3 mg/cm$^2$, and the average thickness of the anode catalyst layer was adjusted to 20 μm.

Using the resultant membrane, an MEA was produced in the same manner as in Example 1, and using the MEA, a unit cell was assembled for measuring fuel cell characteristics. A discharge test was conducted under the same conditions as those of Example 1. As a result, almost no deterioration occurred in the voltage of the cell during long hours of operation.

EXAMPLE 4

2 g of the trapping catalyst coated with the hydrogen-ion conductive polymer electrolyte of Example 1 was mixed with 4 g of the cathode catalyst coated with the hydrogen-ion conductive polymer electrolyte of Example 1. The mixed catalysts were moistened with 5 g of water, and were then mixed with 5 g of ethylene glycol to prepare an ink D in paste form.

Next, the ink D was applied, by screen printing, onto one face of a hydrogen-ion conductive polymer electrolyte membrane having outer dimensions of 13 cm×13 cm, and was then dried in a nitrogen atmosphere to form a mixed catalyst layer. An anode catalyst layer formed on a polypropylene sheet in the same manner as in Example 1 was bonded to the other face of the hydrogen-ion conductive polymer electrolyte membrane by hot pressing. The amount of platinum contained in the mixed catalyst layer on the cathode side was adjusted to 0.5 mg/cm$^2$. The average thickness of the mixed catalyst layer was adjusted to 25 to 30 μm. Also, the amount of platinum contained in the anode was adjusted to 0.3 mg/cm$^2$, and the average thickness of the anode catalyst layer was adjusted to 20 μm.

Using the resultant membrane, an MEA was produced in the same manner as in Example 1, and using the MEA, a unit cell was assembled for measuring fuel cell characteristics. The structure of the MEA is shown in FIG. 5.

In FIG. 5, an MEA 40 comprises a hydrogen-ion conductive polymer electrolyte membrane 41, an anode consisting of a catalyst layer 42 and a gas diffusion layer 45 formed on one face of the polymer electrolyte membrane, and a cathode consisting of a catalyst layer 43 and a gas diffusion layer 46 formed on the other face of the polymer electrolyte membrane. The catalyst layer 43 of the cathode contains a trapping catalyst 44.

A discharge test was conducted on the unit cell under the same conditions as those of Example 1. As a result, almost no deterioration occurred in the voltage of the cell during long hours of operation.

EXAMPLE 5

The ink D of Example 4 was applied, by a bar coater, onto the surface of a polypropylene sheet and was then dried to form a mixed catalyst layer.

Next, a hydrogen-ion conductive polymer electrolyte membrane having outer dimensions of 13 cm×13 cm was sandwiched between the mixed catalyst layer and an anode catalyst layer formed on a polypropylene sheet in the same manner as in Example 1, and the membrane and these layers were bonded to one another by hot pressing (135° C. for 10 minutes). The amount of platinum contained in the mixed catalyst layer was adjusted to 0.5 mg/cm$^2$. The average thickness of the mixed catalyst layer was adjusted to 25 to 30 μm. Also, the amount of platinum contained in the anode was adjusted to 0.3 mg/cm$^2$, and the average thickness of the anode catalyst layer was adjusted to 20 μm.

Using the resultant membrane, an MEA was produced in the same manner as in Example 1, and using the MEA, a unit cell was assembled for measuring fuel cell characteristics. A discharge test was conducted under the same conditions as those of Example 1. As a result, almost no deterioration occurred in the voltage of the cell during long hours of operation.

EXAMPLE 6

The ink B of Example 1 was applied, by a bar coater, onto the surface of a polypropylene sheet and was then dried to form a cathode catalyst layer. Separately, the ink A of Example 1 was applied, by a bar coater, onto the cathode catalyst layer and was then dried to form a trapping catalyst layer.

Next, a hydrogen-ion conductive polymer electrolyte membrane having outer dimensions of 13 cm×13 cm was sandwiched between the two catalyst layers formed on the polypropylene sheet and an anode catalyst layer formed on a polypropylene sheet in the same manner as in Example 1, and the membrane and these layers were bonded to one another by hot pressing (135° C. for 10 minutes). The amount of platinum contained in the cathode composed of the cathode catalyst layer and the trapping catalyst layer was adjusted to 0.5 mg/cm$^2$. The average thickness of the cathode was adjusted to 25 to 30 μm. Also, the amount of platinum contained in the anode was adjusted to 0.3 mg/cm$^2$, and the average thickness of the anode catalyst layer was adjusted to 20 μm.

Using the resultant membrane, an MEA was produced in the same manner as in Example 1, and using the MEA, a unit cell was assembled for measuring fuel cell characteristics. A discharge test was conducted under the same conditions as those of Example 1. As a result, almost no deterioration occurred in the voltage of the cell during long hours of operation.

FIG. 4 shows the changes with time in voltages of the cells of Examples 1 to 6 and Comparative example 1.

In the foregoing examples, the weight ratio of the hydrogen-ion conductive polymer electrolyte coating the trapping catalyst to the carrier of the trapping catalyst was 1.6. By varying this weight ratio, a discharge test was conducted under the same conditions as those of the foregoing examples. Table 1 shows a comparison of cell voltages obtained at the time of a lapse of 1000 hours of operation. As is clear from Table 1, good characteristics are obtained when the weight ratio of the hydrogen-ion conductive polymer electrolyte to the carrier of the trapping catalyst is in a range of 1.6 to 2.0.

TABLE 1

Cell voltage (mV) after a lapse of 1000 hours

| Example | Weight ratio (polymer electrolyte/carrier of trapping catalyst) | | | | |
|---|---|---|---|---|---|
| | 1.6 | 1.4 | 1.8 | 2.0 | 2.5 |
| 1 | 720 | 589 | 720 | 715 | 580 |
| 2 | 703 | 571 | 702 | 695 | 563 |
| 3 | 711 | 591 | 710 | 703 | 592 |
| 4 | 666 | 532 | 660 | 650 | 528 |
| 5 | 660 | 512 | 655 | 640 | 503 |
| 6 | 690 | 570 | 687 | 680 | 568 |

As described above, the present invention can provide a polymer electrolyte fuel cell capable of retaining high power-generation efficiency over an extended period of time by adding a catalyst for promoting the reaction of hydrogen and oxygen to produce water to a catalyst layer or by forming a layer of this catalyst at an interface between the catalyst layer and the hydrogen-ion conductive polymer electrolyte membrane.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A polymer electrolyte fuel cell comprising:
   a hydrogen-ion conductive polymer electrolyte membrane;
   a pair of electrodes sandwiching said hydrogen-ion conductive polymer electrolyte membrane;
   a first separator plate having a gas flow path for supplying a fuel gas to one of the electrodes; and
   a second separator plate having a gas flow path for supplying an oxidant gas to the other of the electrodes,
   wherein each of said electrodes has an electrode catalyst layer comprising at least a conductive carbon particle carrying an electrode catalyst particle and a hydrogen-ion conductive polymer electrolyte, said electrode catalyst layer being in contact with said hydrogen-ion conductive polymer electrolyte membrane, and at least one of said electrodes comprises a catalyst for trapping the fuel gas or the oxidant gas which has passed through said hydrogen-ion conductive polymer electrolyte membrane from the other electrode toward the electrode catalyst layer of said one of said electrodes,
   wherein said catalyst for trapping the fuel gas or the oxidant gas is a catalyst for promoting the reaction of hydrogen and oxygen to produce water; and
   said catalyst for promoting the reaction of hydrogen and oxygen to produce water is carried on a carrier, and
   said carrier carrying said catalyst for promoting the reaction of hydrogen and oxygen to produce water is coated with the hydrogen-ion conductive polymer electrolyte, and
   the weight ratio of the hydrogen-ion conductive polymer electrolyte to said carrier is from 1.6 to 2.0, and
   the catalyst for promoting the reaction of hydrogen and oxygen to produce water is electrically insulated from the electrode by the hydrogen-ion conductive polymer electrolyte.

2. The polymer electrolyte fuel cell in accordance with claim 1, wherein said catalyst for promoting the reaction of hydrogen and oxygen to produce water is included in said electrode catalyst layer.

3. The polymer electrolyte fuel cell in accordance with claim 1, wherein a thin layer of said catalyst for promoting the reaction of hydrogen and oxygen to produce water is formed between said hydrogen-ion conductive polymer electrolyte membrane and said electrode catalyst layer.

4. The polymer electrolyte fuel cell in accordance with claim 1, wherein said catalyst for promoting the reaction of hydrogen and oxygen to produce water is a metal selected from the group consisting of platinum, ruthenium, rhodium and palladium; an alloy comprising said metal; or an oxide of said metal or said alloy.

5. The polymer electrolyte fuel cell in accordance with claim 1, wherein said carrier is selected from the group consisting of carbon black, zirconia, alumina, zeolite and silica.

6. The polymer electrolyte fuel cell in accordance with claim 1, wherein at least one of said electrode catalyst layers comprises a water repellent carbon powder carrying a water repellent material.

7. The polymer electrolyte fuel cell in accordance with claim 6, wherein the ratio of said water repellent carbon powder to the conductive carbon particle carrying the electrode catalyst particle in said electrode catalyst layer is from 3/97 to 50/50.

* * * * *